United States Patent [19]
Hanninen et al.

[11] Patent Number: 4,992,501
[45] Date of Patent: Feb. 12, 1991

[54] REPULPABLE TAPE

[75] Inventors: Robert Hanninen, Groton; Shiro G. Takemoto, Dedham; Mildred C. Richards, Wakefield, all of Mass.

[73] Assignee: The Kendall Company, Lexington, Mass.

[21] Appl. No.: 370,970

[22] Filed: Jun. 26, 1989

[51] Int. Cl.$^5$ .................... C09J 131/02; C09J 131/04
[52] U.S. Cl. .................... 524/272; 428/351; 428/355
[58] Field of Search ................. 524/272; 428/351, 355

[56] References Cited
U.S. PATENT DOCUMENTS

| | | | |
|---|---|---|---|
| 3,441,430 | 4/1969 | Peterson | 524/375 |
| 3,838,079 | 9/1974 | Kosaka et al. | 524/272 |
| 3,865,770 | 2/1975 | Blake | 524/375 |
| 4,442,258 | 4/1984 | Sunakawa et al. | 524/475 |
| 4,482,675 | 11/1984 | Witt | 525/384 |
| 4,569,960 | 2/1986 | Blake | 524/245 |
| 4,913,080 | 11/1983 | Blake | 524/187 |

Primary Examiner—John Kight, III
Assistant Examiner—Rabon Sergent
Attorney, Agent, or Firm—M. Maus

[57] ABSTRACT

Repulpable tapes, their composition and the process of making the same, which retain adhesion and tack over a wide range of humidity and temperature, are provided. The improved composition comprises the addition of 10 to 50 parts by weight of a partially to fully hydrogenated rosin and at least 1 part by weight of polyethylene glycol.

26 Claims, No Drawings

REPULPABLE TAPE

BACKGROUND OF THE INVENTION

This invention relates in general to pressure-sensitive adhesives and in particular to repulpable tapes which retain adhesion and tack over a wide range of humidity and temperature.

Since the need for repulpable tapes is widely recognized in our waste conscious, efficiency conscious and natural resource preservation conscious society, efforts have been made to produce such a product. Illustrative of such attempts are U.S. Pat. No. 4,569,960; 4,413,080 and 3,865,770 all issued to Blake; U.S. Pat. No. 3,441,430 issued to Peterson; U.S. Pat. No. 4,442,258 issued to Sunakawa; and U.S. Pat. No. 4,482,675 issued to Witt and invented by the present assignee.

While the aforementioned tapes are all successfully water-dispersible they vary in repulpability, tack and shear strength (also referred to as creep) and all three properties are not optimally met over a wide range of relative humidity. Shear strength and relative humidity stability are advantageous properties given the commercial application of repulpable tapes, namely the paper industry.

Any industry which uses or makes rolls of paper, requires a continuous operation and consequently requires tape which allows for the uninterrupted feeding of one roll of paper to another.

These properties are particularly advantageous in the paper making and printing facilities wherein repulpable splicing tape is necessitated to connect the beginning of one roll to the end of another to assure continuity or to reconnect cut-out defective segments.

Continuity is further advanced by the repulpable property of such tapes in that the repulpability eliminates separating the tape from the paper waste. Moreover, since the tape is recyclable it is also ecologically advantageous because the tape can be thrown in with the paper waste. However, the largest promotor of continuity is adhesion.

The physical conditions that exist in the paper manufacturing facilities are variable ranging from hot to cold temperature and low to high relative humidity given the amount, length or speed of production. Thus, it is highly desirable for an efficient and continuous operation to have tapes that are stable i.e., maintain adhesion over a wide range of physical extremes such as low and high relative humidity. Although the prior art teaches water-dispersibility it does not teach how to achieve repulpability, tack and creep simultaneously over a wide range of relative humidity. These shortcomings are evident in the aforementioned illustrative patents, which will now be described in detail.

U.S. Pat. No. 3,441,430 issued to Peterson describes repulpable splicing tapes which adhere to wet or hydrophilic surfaces which are made by coating one or both surfaces of a paper backing with a water-soluble copolymer of an acrylic acid and an ether acrylate, plasticized with at least an equal amount of a liquid water-soluble plasticizer having at least one ether linkage, e.g., polyethylene glycol monophenyl ether. Due to the ether linkage and resultant oxidation sensitivity it loses significant tackiness, flexibility, and repulpability when exposed to high temperature and humidity.

U.S. Pat. No. 3,865,770 issued to Blake describes water-soluble acrylate vinyl carboxylic acid copolymers partially neutralized with alkanolamines.

U.S. Pat. No. 4,413,080 issued again to Blake describes a water-dispersible pressure-sensitive adhesive wherein certain acrylate:acrylic acid copolymers are blended with acidic rosin or rosin derivative, partially neutralized with KOH in combination with NaOH and/or LiOH, and plasticized with an oily water-soluble polyoxyethylene compound.

U.S. Pat. No. 4,569,960 issued to Blake describes a blend of acrylate:acrylic acid copolymer, NaOH and/or LiOH, KOH, and certain ethoxylated plasticizing components. This patent is an improvement over the previous U.S. Pat. No. 4,413,080 issued to Blake in that it describes the disadvantages of the previous patent as follows: "upon exposure to elevated temperatures, the plasticizer may separate and migrate into layers of paper adjacent the splice, causing transparentization and decreased adhesion" Column 2, line 25-29. Notably, Pat. No. 4,413,080 and 4,569,960 primarily address splicing carbonless paper without adversely affecting its performance, whereas U.S. Pat. No. 3,865,770 addresses splicing tapes in general.

In sum, while the tapes described in the aforementioned Blake patents maintain tack in a low humidity environment i.e. below 20%, they lose significant tack in a high humidity environment i.e. above 85%.

U.S. Pat. No. 4,442,258 issued to Sunakawa et. al. describes a "polymerization product obtained by the solution polymerization of a water-soluble ethylenically unsaturated monomer, alone or in combination with a water-soluble ethylenically unsaturated monomer copolymerizable with the water-soluble ethylenically unsaturated monomer, in the presence of a plasticizer selected from the group consisting of polyetherpolyols and polyhydric alcohols having a molecular weight of less than 3,000 and which is liquid at room temperature." Column 2 Lines 55-64. While this product is repulpable and maintains good tack over a broad range of humidity, it gives variable creep at 150° F. (2-100 hr) and at 70° F. (approximately 8 hrs).

Lastly, U.S. Pat. No. 4,482,675 issued to Witt and invented by the present assignee describes a composition comprising acrylate based polymer systems containing carboxylic functionality which are at least partially esterified with an ethoxylate of alkyl phenol or aliphatic alcohol and then at least partially neutralized with alkaline material. While the Witt paper splicing tape is water soluble and repulpable, its adhesive properties are water dependent. Hence, as the percent of moisture increases, the tack increases. Consequently, under low moisture environmental conditions, misting is required. The present invention maintains repulpability plus it advantageously alleviates the need for misting while simultaneously improving tack and shear strength, i.e. adhesion.

SUMMARY OF THE INVENTION

The present invention provides for a water dispersible pressure sensitive adhesive having all the advantages of U.S. Pat. No. 4,482,675, including repulpability, plus the additional advantages of improved tack and shear strength over a wide range of relative humidity and temperature by modifying the adhesive composition described and claimed therein to include further a partially to fully hydrogenated rosin and an effective amount of polyethylene glycol.

DETAILED DESCRIPTION OF THE INVENTION

The foregoing and related objects are attained in accordance with the invention which in its broader aspects provides a water-soluble, pressure-sensitive adhesive composition comprising (1) 49 to 89 parts by weight of the neutralized (and particularly the alkali metal salts) reaction product of a $C_6$–$C_{18}$ alkyl phenol or $C_6$–$C_{18}$ alkanol containing about 4 to 30 moles combined ethylene oxide with a copolymer obtained by the polymerization of a monomer composition comprising by weight: from about 35 to 85% of acrylate monomer of the formula $CH_2$=$C(R)$-$COOR_1$ wherein R is hydrogen or $C_1$–$C_4$ alkyl, and $R_1$ is $C_1$–$C_{14}$ alkyl; with the proviso that at least 60% is $C_4$ substituted (i.e. for $R_1$) acrylates; from about 8 to 30% of an alpha,beta-ethylenically unsaturated di-carboxylic acid anhydride and from about 8 to 30% of monomer selected from vinyl esters hydrolized or unhydrolized, vinyl ethers, vinyl halides, styrene, $C_1$–$C_4$ alkyl styrenes, lower ($C_1$ to $C_6$) alkyl methacrylates and alpha-olefins, the weight ratio of acrylate to anhydride being from about 1.5:1 to 8:1, the amount of said alkyl phenol or alkanol being sufficient to provide an alkyl phenol or alkanol:anhydride mole ratio of about 0.3 to 1.0 and at least about 0.7 when said acrylate:anhydride weight ratio is below about 4; (2) from about 10 to about 50 parts by weight of a partially to fully hydrogenated rosin; and (3) at least 1 part by weight of polyethylene glycol.

The hydrogenated rosins which may be utilized in the practice of this invention are well known in the art and accordingly per se comprise no part of this invention. Suitable rosins of this description include the class known as wood rosins having a degree of hydrogenation from 1–100%. Such wood rosins in general, essentially contain abietic acid, isomers and derivatives thereof. As examples of illustrative rosins of this description mention may be made of "Staybelite" and "Foral AX" (both trademarks of Hercules Chemical Company.

Useful polyethylene glycols are those having a molecular weight of at least 200 to reduce volatility. Preferrably such polyethylene glycols are liquid. Such polyethylene glycols are commercially available, for example, from Union Carbide under the trademark "Carbowax".

In a further aspect, the invention provides a process for preparing such adhesive comprising contacting the monomer(s) in bulk or as a solution of said monomer composition with an effective amount of polymerization catalyst at a temperature of about 65°–85° C., for a time sufficient to enable at least substantial conversion of monomer to polymer, thereafter contacting said polymer with a sufficient amount of the described alkanol or alkyl phenol esterifying agent to provide an alkyl phenol or alkanol:anhydride mole ratio of about 0.3 to 0.8 and at least about 0.7 when said acrylate:anhydride weight ratio is below about 4, said 65°–85° C., temperature being maintained throughout the esterification reaction and thereafter neutralizing said esterified polymer with an alkaline material at a temperature from about 0° C., to 100° C., preferably 15°–40° C., more preferably at about 20° to 30° C., mostly preferably at about 25° C., to provide a degree of neutralization from about 0.5 to 1.0 and sufficient to provide a water-soluble polymer product; adding 10–50 parts by weight of a partially to fully hydrogenated rosin to 100 parts by weight of the resulting polymer; and thereafter adding at least 1 part by weight of polyethylene glycol.

In accordance with particularly preferred embodiments, contacting of monomer and catalyst is effected incrementally by dividing the catalyst into separate solution portions, e.g., a first catalyst solution comprising about 70–80% of the total weight of catalyst solution to be charged and a second, more concentrated, catalyst solution. When so proceeding, about 30 to 60% of the total monomer to be charged is initially contacted with about 30 to 60% of the first catalyst solution in the reaction medium. The remaining monomer and balance of the first catalyst solution are later added simultaneously, followed by addition of the entire quantity of the second catalyst solution, all additions being made according to a predetermined time sequence.

In accordance with the invention, it is found that both esterification and neutralization of the base polymer, e.g., acrylate/acetate/anhydride, are essential in order to provide an effective polymeric adhesive. Thus, the neutralized but non-esterified base polymer, although water-soluble, possesses no creep (shear adhesion), tack, or adhesive properties. Conversely, the esterified but non-neutralized base polymer is neither water-soluble nor dispersible, and is totally lacking in cohesive strength within the limits tested. Moreover, probe tack is virtually non-existent unless inordinately high mole ratios of nonionic-anhydride are used.

Esterification with the nonionic materials to be described in detail increases the adhesion and tack of the base polymer, this being attributable, most probably, to the plasticizing effect of the polyethoxyl moiety present in the nonionic material. However, excessive amounts of nonionic tend to impair cohesive strength; thus with reference to a base polymer of butyl acrylate-vinyl acetate-maleic anhydride (78-10-12 on a parts by weight basis) optimum properties regarding tack, adhesion and cohesive strength are obtained with the use of about 60 php (parts per hundred parts of polymer) of nonionic. In the case of Igepal CO-630 nonionic, a preferred esterifying agent herein comprising the reaction product of nonylphenol with 9 moles ethylene oxide, this corresponds to a mole ratio of nonionic to the maleic anhydride included in the base polymer of about 0.79. Should the neutralization step be omitted, it is found that increasing the degree of esterification decreases the cohesive strength.

Neutralization of the esterified base polymer with alkali improves the cohesive strength, water solubility, adhesion and tack of the polymer. Thus, for the 78/10/12 butyl acrylate/vinyl acetate/maleic anhydride base polymer, hereinafter also designated BuA/-VA/MAH, complete water solubility thereof is obtained when treated with 40 to 60 php of the CO-630 nonionic and neutralizing to a degree greater than 0.75. With 30 php of the same nonionic, the esterified polymer is water-dispersable at complete neutralization. Thus, polymer solubility is apparently a function of both the ethoxyl concentration and ionized carboxyl functionality. When fully neutralized with NaOH, or other alkali metal hydroxides, all polymeric adhesives in accordance with the invention pass the repulpability test.

Cohesive strength of the instant compositions, as evaluated by 150° F., creep measurements (applied stress of 500 $g/in^2$, is found to increase with increased degree of neutralization.

Acrylate monomers useful herein for preparing the base copolymer have the formula

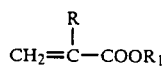

$$CH_2=C-COOR_1$$
$$\ \ \ \ \ \ \ \ \ |$$
$$\ \ \ \ \ \ \ \ \ R$$

wherein R is hydrogen or $C_1$–$C_4$ alkyl and $R_1$ is alkyl of 1 to 14 and preferably 2 to 6 carbons. Examples include methylacrylate, 2-ethylhexylacrylate (2EHA) and most preferably, butyl acrylate (BuA). Methyl Methacrylate (MMA), though normally considered to be a high Tg type of monomer capable of increasing the modulus and thus cohesive strength of the product, copolymer is not as effective as the Vinyl Acetate hydrolized or unhydrolized (VA). Use of MMA is in addition to, rather than in lieu of BuA. When compared to the BuA-containing base polymer, the 2EHA system exhibits lower cohesive strength as indicated by the 150° F., creep (shear) test as well as lower adhesion-tack values.

The acrylate monomer should comprise from about 35 to 85 by weight of the monomer mixture and in forming the base polymer product with a range of about 40 to 80% being preferred. Generally, as the proportion of acrylate is increased, the amount of nonionic required for esterification, expressed as a mole ratio on the basis of anhydride, is decreased, as is demonstrated in the Witt examples. The weight ratio of acrylate monomer to anhydride comonomer should be from about 1.5:1 to 8:1, and preferably 4:1 to 7:1. In the most preferred embodiments, such ratio approximates 6.5:1.

Alpha-beta-ethylenically unsaturated di-carboxylic anhydride monomers useful herein for preparing the base copolymer include maleic, citraconic and itaconic anhydrides with maleic anhydride (MAH) comprising the preferred species. The anhydride constitutes from about 8 to 30% and preferably 8 to 20% by weight of the monomer composition. As will be demonstrated in the examples, decreasing the anhydride proportion provides a more favorably characterized copolymer product.

The remaining component of the comonomer composition is selected from vinyl esters, e.g., vinyl acetate, vinyl propionate, vinyl butyrate, etc; styrene, alkyl styrenes such as alpha-methyl styrene; lower alkyl methacrylates, e.g., methyl methacrylate; vinyl halides, e.g., vinyl chloride; vinyl alkyl (preferably $C_1$ to $C_4$) ethers, e.g., vinyl methyl ether, vinyl ethyl ether, etc., and alpha-olefins, e.g. ethylene and propylene. Preferred species include vinyl acetate, styrene and MMA, with vinyl acetate being particularly preferred. This monomer component constitutes about 8 to 30% and preferably about 10–25% by weight of the comonomer mixture. In particularly preferred compositions, e.g., including vinyl acetate, such monomer comprises about 10% of the monomer mixture.

The base polymer as made available for esterification with nonionic has a viscosity of from about 500 to 1500 and preferably 800 to 1200 cps as measured on a Brookfield viscometer model RVT spindle #4@50 rpm.* Polymerization as described herein proceeds to at least about 93% conversion. Specific examples of base interpolymers useful herein include the following:

BuA/VA/MAH (78-10-12)
BuA/VA/MAH (70-10-20)
BuA/VA/MAH (65-15-20)
BuA/VA/MAH (65-25-10)
BuA/VA/MAH (60-10-30)
BuA/VA/MAH (45-25-30)
BuA/Sty/MAH (78-10-12)
BuA/MMA/MAH (78-10-12)
2EHA/VA/MAH (78-10-12) Nonionic materials useful herein for esterification of the base polymer generally comprise a $C_6$–$C_{18}$ and preferably $C_8$ to $C_{18}$ alkyl phenol or $C_8$–$C_{18}$ alkanol containing about 4 to 50 and preferably 6 to 30 moles combined ethylene oxide. Specific materials include without necessary limitation Igepal CO-630 comprising nonyl phenol condensed with about 9.5 moles ethylene oxide and commercially supplied by GAF; Igepal CO-530 comprising nonyl phenol condensed with 6 moles ethylene oxide, Igepal CO-430 comprising nonyl phenol condensed with 4 moles ethylene oxide; Igepal CO-880 comprising nonyl phenol condensed with 30 moles ethylene oxide, Tergitol 15-S-5 supplied by Union Carbide comprising linear $C_{11}$–$C_{15}$ alcohol condensed with 5 moles ethylene oxide and Triton X-45 supplied by Rohm & Haas comprising octyl phenol condensed with 5 moles ethylene oxide. Esterification is generally effected at elevated temperature, e.g., 65°–85° C., by adding the nonionic to the reaction medium containing the pre-formed polymer as previously described. The amount of nonionic used is from about 30–80 and preferably 50–70 php corresponding to a mole ratio expressed on the basis of anhydride in the base polymer of about 0.3 to 1.0 and at least about 0.7 when the acrylate:anhydride weight ratio in the polymer is below about 4.

*about 50% polymer solution in ethyl acetate/toluene (80-25) at 23° C.

The post esterified base polymer is thereafter neutralized with an alkali to provide a degree of neutralization of from about 0.5 to 1.0. The use of organic amines such as dimethyl and trimethyl amine provides a water-insoluble product which fails the repulpability test and has little or no cohesive strength. These results are obtained despite stoichiometric neutralization of the esterified polymer. Preferred are alkali metal hydroxides and carbonates. Although in certain embodiments an adhesive polymer product is obtained having severely reduced cohesive strength, such materials are nevertheless useful in a variety of applications, since they are water-soluble or dispersible and possess satisfactory adhesion-tack properties. According to particularly preferred embodiments, e.g., esterification of a BuA/VA/MAH base polymer with the Igepal CO-630 nonionic material in amounts providing a mole ratio on the basis of MAH of about 0.67 followed by stoichiometric neutralization with NaOH, the adhesion, tack and cohesive properties are optimized in the water-soluble adhesive products.

The neutralized product is then agitated and 10–50 parts by weight of a partially to fully hydrogenated rosin to 100 parts by weight of polymer is added. Lastly, at least one part by weight of polyethylene glycol is added to said resultant mixture.

The following example shows by way of illustration and not limitation one of the preferred embodiments of this invention.

The base copolymers of the following examples are prepared as follows, specific reference being now made to the BuA/VA/MAH polymer species. Monomer and catalyst solution having the following composition are provided:

| Monomer Solution | Parts | Catalyst Solutions 1, 2, & 3 | Parts | Reactor Solution | Parts |
|---|---|---|---|---|---|
| | | Catalyst 1 | | | |
| BuA | 78 | Ethyl Acetate | 9.95 | Ethyl Acetate | 52.1 |
| VA | 10 | AIBN* | 0.15 | AIBN* | |
| MAH | 12 | Catalyst 2 | | | |
| Ethyl Acetate | 28.7 | Ethyl Acetate | 9.20 | | |
| | | AIBN* | 0.35 | | |
| | | Catalyst 3 | | | |
| | | Ethyl Acetate | 4.97 | | |
| | | AIBN* | 0.30 | | |

*Azobisisobutyronitrile

Example 1

Polymerization

A reaction mixer is charged with 14.4 lbs of ethyl acetate, sparged with nitrogen and heated to 140°-145° F. A monomer mix consisting of 7.72 lbs of ethyl acetate (urethane grade), 2.69 lbs of vinyl acetate, 21.01 lbs of butyl acrylate and 3.23 lbs of maleic anhydride was prepared. 30% of this monomer mix was added to the reactor while maintaining the temperature at 140°-145° F. A catalyst solution of 18.2 grams of AIBN in 2.68 lbs of ethyl acetate was then added and the resulting exotherm was controlled by cooling to maintain the temperature at 178°-180° F. for about one hour. After this initial hold period, the remaining (70%) monomer mix and additional catalyst (42.8 grams of AIBN in 2.48 lbs of ethyl acetate) were fed concurrently over a 60-90 minute period while maintaining a gentle reflux at 180°-182° F. The resultant mix was held at 180° F. for one hour. Thereafter, chaser catalyst solution consisting of 0.081 lb of AIBN and 1.34 lb of ethyl acetate was added followed by a second one hour hold period at 180° F. followed by a cooling period.

The polymerization is found to proceed to 94.1% conversion by the end of the 1½ hour hold period. Continued heating in the absence of the polyethoxylated alcohol for an additional 3 hours results in a conversion of essentially 100%. The Brookfield viscosity model RVT spindle #4 @50 rpm is determined to be 920 l cps.

Esterification and Neutralization 94.432 grams of potassium acetate and 16.28 lbs of Igepal Co-630 were added to the aforementioned mix and the resultant mixture was heated to 176°-180° F. for a two-hour period. The mixture was then cooled to 160° F.. Esterification of the polymer product is effected with Igepal Co-630 at a concentration range of up to 60 php corresponding to an Igepal/MAH mole ratio range of up to about 1.0. A solution of ethyl acetate toluene was then added. The resultant mixture was stirred for five minutes and a 50% sodium hydroxide solution was then added, thereby neutralizing the partially esterified polymer. The mixture was then heated to reflux (176° F.) for 1.5 hours and thereafter cooled to 100° F. or less. To the resultant polymer solution was then added 46.1 pounds of hydrogenated rosin and 17.7 lbs of polyethylene glycol and the resultant mixture was stirred until homogeneity was achieved.

EXAMPLE 2

Double-Faced Tape

The adhesive formulation prepared in Example 1 was coated onto a conventional release sheet and dried to provide a layer 1.8 mils thick. A tissue paper was then applied over the adhesive surfaces after which a second layer of adhesive approx. 1.8 mils thick was coated on the tissue paper surface to form the double-faced tape which, when used, is separated from the release sheet. Alternatively the second adhesive layer may be transfer coated by contacting the tissue with adhesive on a release sheet.

The tape prepared above was subjected to loop tack and shear force testing of its adhesive properties in accordance with the following test methods.

In the loop tack test method Hammerhill xerographic paper is affixed to a horizontal plate using double faced tape, and the excess trimmed off, taking care not to touch the surface of the paper. Another piece of the same paper should be used to press down the substrate smoothly onto the horizontal plate.

An Instron tester is set so as to afford a 6 inch gauge length between the horizontal plate's paper surface and the lower edge of the Instron upper jaw. The Instron front panel is set such that the jaw can be lowered to bring the tape loop into full compact with the 2 inch wide horizontal test panel. This lower extension during testing is approximately 4 inches giving a 2 inch gauge length. The jaw is then raised to remove the tape. Both lowering onto and removal from the test panel is accomplished at 12 inches per minute.

A 12 inch long strip of tape is formed into a loop, with the adhesive side facing out. The two ends are placed into the Instron upper jaw so that ¾ of an inch of the test specimen ends are within the jaw's grip. The loop is now hanging down so that upon lowering the Instron upper jaw, the tap loop will come in contact with the prepared 2 inch wide horizontal plate. This will cause an area of 2 inches by the tape's 1 inch width to be completely covered by the bottom of the loop.

After lowering the loop onto the prepared surface at 12 inches per minute, the tape is then pulled away from the substrate at 12 inches per minute. The work to remove the tape is electronically or manually read from the machine or chart.

The High Temperature Shear Adhesion test method used to obtain the following data is a modification of the standard Pressure Sensitive Tape Council No. 7 Test Method, in that the contact area to a stainless steel panel is 1×2 inches with a mass of 1 kg, all other criteria being the same. The apparatus is set to maintain 66+2° C. Samples were tested by immediately applying the mass to the tape as the panels were placed in the apparatus.

Table I shows the test results when subjecting the samples to the aforementioned tests.

TABLE I

| Coating Method 2nd Side | Ave Loop Tack oz-in | | 150° F. Shear Time in Hrs. | |
|---|---|---|---|---|
| | Side 1 | Side 2 | Side 1 | Side 2 |
| Direct | 15.7 | 18.2 | 100+ | 100+ |
| Transfer | 40.8 | 20.3 | 100+ | 100+ |

The tape prepared above was also subjected to testing of Loop Tack to paper at different moisture contents.

As will be apparent from the results shown below in Table II, tackiness is not dependent upon moisture content, as distinguished from the prior art. In other words, tackiness is not dependent upon moisture content.

TABLE II

| % Moisture | (300° F., 3 min) Ave Loop Tack To Paper (in-oz) |
|---|---|
| 1.46 | 35.9 |
| 3.96 | 41.8 |

To confirm this observation, the two-faced tape of this invention, as prepared in Example 1 (TEST), was compared with four similar tapes of varying moisture contents prepared in accordance with the aforementioned Witt patent. These results are shown in Table III.

TABLE III

| Sample | % Moisture | Polyken Probe Tack (g) | 150° F. Shear Force (hr.) |
|---|---|---|---|
| A (Control) | 8 | 325 | 0.2 |
| B (Control) | 6.5 | 150 | 0.2 |
| C (Control) | 6 | 100 | 0.2 |
| D (Control) | 5 | 20 | Not Tested |
| F (TEST) | 4.1 | 576 | 100+ |

As seen from Table III, the probe tack of the control tapes of the prior art decrease materially as the moisture content decreases. For example, a percentage decrease from 8 to 5 percent results in a probe tack decrease from 325 to 20. Notably, Polyken Probe Tack is a patented test method fully described in expired U.S. Pat. No. 3,214,971.

EXAMPLE 3

Single-Faced Tape

A single-faced tape was prepared by reverse roll coating an adhesive as prepared in Example 1 onto a silicone-coated paper.

The tape prepared above demonstrated further improvement over the prior art, namely adhesion stability, as measured by loop tack, over broad humidity ranges as evidenced by Table IV.

TABLE IV

| Temp. °F. | Rel. Humidity (percent) | Exposure Time (min.) | Loop Tack (in-oz) |
|---|---|---|---|
| 54–57 | 23–25 | 5 | 23.1 |
| | | 10 | 30.6 |
| | | 20 | 27.8 |
| | | 30 | 30.2 |
| 71–72 | 46–53 | 5 | 32.0 |
| | | 10 | 28.5 |
| | | 20 | 30.0 |
| | | 30 | 31.7 |
| 84–87 | 81–100 | 5 | 12.7 |
| | | 10 | 14.1 |
| | | 20 | 13.2 |
| | | 30 | 14.5 |

This sample was further subjected to a shear strength and repulpability test yielding the following results:
150° Shear Test—100+ Hr.
Repulpability Test—Pass
Samples were evaluated for repulpability and water solubility by first pigmenting the base polymer solution with dye and then forming a single faced tape in accordance with Example 3.

Repulpability is determined by adhering a 1×11-inch strip of the tape product onto a 8½×11-inch sheet of Hammermill "Fore Xeroxcopy" paper. This sheet along with two other sheets are then cut into 1-inch square pieces. Thus, the tape product is dispersed with approximately 13 gms of paper stock. The paper is added to a "Waring Blender" containing 600 mls of room temperature water. The blender is then run at "liquefy" speed for 20 seconds, rinsed down with water, and re-run for two additional 20 seconds.

Approximately 170 mls of the resulting pulp dispersion is then diluted to 250 mls with water and vacuum filtered, using a large Buchner funnel, fitted with a fine mesh screen. The resulting paper "cake" is then compressed and examined for any coloration. The absence of color is taken as evidence of repulpability.

Water solubility is determined by placing a tape strip into water and observing the resulting solution. In most instances, repulpability and water solubility results are found to be equivalent. Only when the polymer is water dispersible would there be a discrepancy between the two tests, i.e., the tape can be repulpable yet the adhesive not completely water soluble.

Lastly, to demonstrate still a further improvement over the prior art, namely versatility and hence utility on different surfaces, a loop tack test was performed adhering the tape to a newsprint surface. Table V illustrates the positive results.

TABLE V

| | Loop Tack To Newsprint Surface at 50% R.H. | |
|---|---|---|
| Exposure (min) | Example in-oz | Commercially Available Modified Acrylate in-oz |
| 1 | 23.4 | 12.5 |
| 5 | 25.1 | 13.7 |
| 10 | 24.3 | 12.3 |
| 15 | 25.7 | 11.8 |
| 20 | 29.4 | 10.3 |
| 30 | 23.3 | 10.9 |

By way of recapitulation, the task of the present invention in its simplest terms is to provide a humidity stable repulpable tape. The invention accomplishes this by adding to the polymer described in U.S. Pat. No. 4,482,675 an effective amount of a partially to fully hydrogenated rosin and polyethylene glycol. As a result, repulpable tape of this invention displays excellent loop tack and shear resistance over a broad range of relative humidity and temperature, as well as versatility of adhesion to different surfaces.

Since certain changes may be made without departing from the scope of the invention herein described, it is intended that all matter described in the foregoing description, including the examples, shall be interpreted as illustrative and not in a limiting sense.

What is claimed is:

1. In a pressure-sensitive adhesive composition for preparing repulpable pressure-sensitive tapes comprising
    (1) 49 to 89 parts by weight of the neutralized reaction product of a $C_6$-$C_{18}$ alkyl phenol or $C_6$-$C_{18}$ alkanol containing about 4 to 30 moles combined ethylene oxide with a copolymer obtained by the polymerization of a monomer composition comprising by weight: from about 35 to 85% of acrylate monomer of the formula $CH_2=C(R)-COOR_1$ wherein R is hydrogen or $C_1-C_4$ alkyl, and $R_1$ is $C_1-C_{14}$ alkyl; with the proviso that at least 60% is $C_4$ substituted (i.e. for $R_1$) acrylates; from about 8 to 30% of an alpha,beta-ethylenically unsaturated di-carboxylic acid anhydride and from about 8 to 30% of monomer selected from vinyl esters, vinyl ethers, vinyl halides, styrene, $C_1-C_4$ alkyl styrenes, lower ($C_1$ to $C_6$) alkyl methacrylates and alpha-olefins, the weight ratio of acrylate to anhydride being from about 1.5:1 to 8:1, the amount of said alkyl phenol or alkanol being sufficient to provide an alkyl phenol or alkanol:anhydride mole ratio of about 0.3 to 1.0 and at least about 0.7 when said acrylate:anhydride weight ratio is below about 4; the improvement wherein said composition further includes (2) from about 10 to about 50 parts by weight of a partially to fully hydrogenated rosin; and (3) at least 1 part by weight of polyethylene glycol; said composition being characterized by retaining its adhesion properties over a wide range of humidity and temperature.

2. The composition as described in claim 1, wherein said acrylate monomer is butyl acrylate.

3. The composition as described in claim 1, wherein said anhydride is maleic anhydride.

4. The composition as described in claim 1, wherein the auxiliary monomer is vinyl acetate.

5. The composition as described in claim 4, wherein the vinyl acetate is hydrolized.

6. The composition as described in claim 1, wherein said partially to fully hydrogenated rosin is a wood rosin.

7. The composition as described in claim 6, wherein said wood rosin is abietic acid.

8. The composition as described in claim 1, wherein said polyethylene glycol has a molecular weight of at least 200.

9. The composition as described in claim 8, wherein said polyethylene glycol is liquid.

10. A repulpable tape comprising a support carrying a layer of a composition as described in claim 1.

11. The repulpable tape as described in claim 10, wherein said acrylate monomer is butyl acrylate.

12. The repulpable tape as described in claim 10 wherein said anhydride is maleic anhydride.

13. The repulpable tape as described in claim 10, wherein the auxiliary monomer is vinyl acetate.

14. The repulpable tape as described in claim 13, wherein the vinyl acetate is hydrolized.

15. The repulpable tape as described in claim 10, wherein said partially to fully hydrogenated rosin is a wood rosin.

16. The repulpable tape as described in claim 15, wherein said wood rosin is abietic acid.

17. The repulpable tape as described in claim 10, wherein said polyethylene glycol has a molecular weight of at least 200.

18. The repulpable tape as described in claim 10, wherein said polyethylene glycol is liquid.

19. A process for making the adhesive composition as described in claim 1, comprising the steps of (1) polymerizing said monomer composition to form a polymer;

(2) esterifying said resultant polymer with a sufficient amount of alkanol or alkyl phenol;

(3) neutralizing said esterified polymer with an alkaline material;

(4) adding 10–50 parts by weight of a partially to fully hydrogenated rosin to 100 parts by weight of the resultant neutralized polymer; and thereafter (5) adding at least 1 part by weight of polyethylene glycol.

20. The process as described in claim 19 wherein polymerization was promoting by adding a catalyst solution of Azobis-isobutyronitrile and ethyl acetate.

21. The process as described in claim 19, wherein esterification is effected by adding Igepal Co-630.

22. The process as described in claim 19, wherein the alkaline material is sodium hydroxide.

23. The process as described in claim 19, wherein the rosin is a wood rosin.

24. The process as described in claim 23, wherein the wood rosin is abietic acid.

25. The process as described in claim 19, wherein the polyethylene glycol has a molecular weight of at least 200.

26. The process as described in claim 19, wherein the polyethylene glycol is liquid.

* * * * *